United States Patent Office 3,289,478
Patented Dec. 6, 1966

3,289,478
SUPERVISORY SYSTEM FOR TEMPERATURES OF ELECTRIC CABLES
Shinichi Tokunaga, Kawasaki-shi, and Toshio Kasahara, Kamakura-shi, Japan, assignors to Showa Densen Denran Kabushiki Kaisha, Kawasaki-shi, Japan, a joint-stock company of Japan
Filed Mar. 2, 1964, Ser. No. 348,652
6 Claims. (Cl. 73—339)

This invention relates to supervisory systems for temperatures of electric power cables and more particularly to a novel supervisory system for temperatures of electric power cables wherein the temperature of a sheath (including not only metal sheath such as lead or aluminium but also anticorrosion sheath of rubber, plastic and the like) and the current flowing through a conductor are measured, and the temperature of the conductor is automatically computed from these measured values.

In large capacity underground main transmission lines or lead out portions in electric power stations it is usual to lay a plurality of single core power cables in the same cable duct, and it is highly desirable to constantly supervise the temperatures of the conductors of such main cables in order to assure efficient maintenance and control and also to improve the utilization factor of the power cables.

However, it has been considered impossible to measure constantly the conductor temperature of electric power cables so that constant supervision of the temperature has not been practiced, and it has been the practice to indirectly presume the temperature of cables from the transmitted quantity of electric power.

Accordingly, it is an object of this invention to provide a novel supervisory system for temperatures of electric power cables which can constantly supervise the temperatures by measuring the temperatures of the cable conductor by relatively simple, yet accurate means.

Generally, a single core electric power cable is so constructed that an insulation layer and a metal sheath are applied on a central conductor and a layer of anti-corrosion material is applied thereon. Thus, in such a cable, as the temperature distribution is symmetrical with respect to the longitudinal axis of the cable, the temperature of the conductor in a steady heat transfer condition can be obtained from the following equation if the temperature of the sheath is measured at a point thereon, if the current flowing through the conductor is measured to determine the thermal flow occurring in said cable, and, further, if the temperature difference between the sheath and the conductor due to the thermal resistance between them is known.

$$T = T_s + KI^2$$
$$= T_s + T_c$$

where:

T is the temperature of the conductor;
$T_s$ is the temperature of the sheath;
K is a correction factor (a constant determined by the type of the cable and is substantially equal to the product of the resistance of the cable conductor and the thermal resistance of insulation);
I is the conductor current; and
$T_c$ is the temperature difference between the conductor and the sheath.

As can be clearly noted from the above equations, the conductor temperature T is equal to the sum of the temperature of the sheath $T_s$ and the temperature difference between the conductor and the sheath which can be determined from the conductor current I. The correction factor K can be determined very accurately by previous measurement.

The above description relates to the theory of measurement under a perfectly steady heat transfer condition. However, in the actual use of cables, the fact that their conductor currents are constantly varying must be considered. Inasmuch as the cable has a substantial thermal capacity, when the conductor temperature varies, the conductor temperature does not respond instantly to this variation but exhibits a time delay corresponding to the thermal time constant thereof. Accordingly, when the conductor current varies, the second term on the right hand side of the above equation must be compensated for the time delay dependent upon the relationship between the time which has elapsed subsequent to said variation and the conductor temperature (hereinafter, this relationship will be referred to as the thermal delay characteristic). This thermal delay characteristic is analogous to the transient characteristic of the voltage appearing across a capacitor when a series circuit including said capacitor and a resistor is connected to a source of electric current. Therefore, time delay compensation can be effected by utilizing a suitable four-terminal network comprising a resistor and a capacitor having a required time constant dependent upon the type and the dimension of the cable.

The resistance-temperature coefficients of copper and aluminium which are commonly used as cable conductors are about $4 \times 10^{-3}/°C$. This means that a temperature variation of about 50° C. will produce a resistance variation of about 20%. Since such a wide variation in the electrical resistance results in errors in the measurement, it is preferable to correct the correction factor K in accordance with the conductor temperature.

According to this invention, the variation in resistance due to the temperature variation of the cable conductor can be corrected for by utilizing the fact that the output voltage of an addition circuit, which will be described later, is proportional to the conductor temperature of the cable and by feeding back a portion of the output voltage.

Accordingly, an object of this invention is to provide a temperature supervisory system for power cables wherein a conductor current of a cable detected by a conductor current detector is applied to a squaring circuit to obtain its squared value, which is multiplied by the correction factor in a correction factor multiplying circuit, and then the resulting product is compensated for time delay in a thermal delay simulation circuit to produce a conductor-sheath temperature difference signal, and wherein the difference signal is added in an addition circuit to a sheath temperature signal detected by a sheath temperature detector to be indicated by an indicator.

A further object of this invention is to provide a system which provides compensation for the resistance variation due to temperature variation of the cable conductor by feeding back a portion of the output of the adding circuit in the above system.

Further objects and advantages of the present invention will become apparent and this invention will be better understood from the following description, reference being made to the accompanying drawings. The features of novelty which characterize the invention are set forth in the claims annexed to and forming part of this specification. In the drawings:

Figure 1:
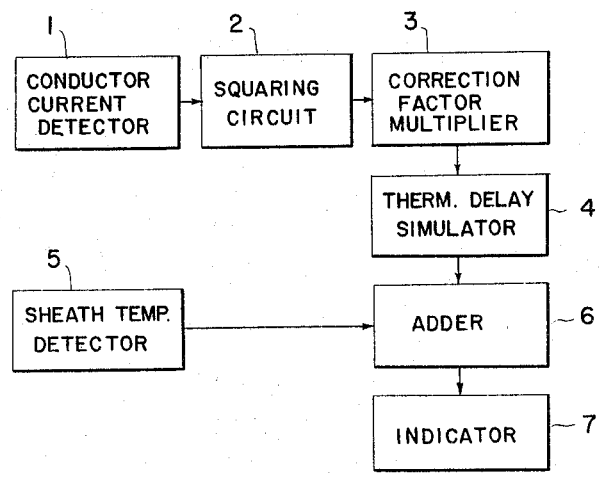
FIG. 1 is a block diagram illustrating the principle of this invention.

Referring now to the accompanying drawing, the supervisory system of the invention, in general principle, as shown by the block diagram in FIG. 1 comprises a detector 1 of the cable conductor current, such as a current transformer, a squaring circuit 2, a correction factor multiplying circuit 3, a thermal delay simulating circuit 4, a sheath temperature detector 5, an addition circuit 6 and an indicator 7.

Figure 2:
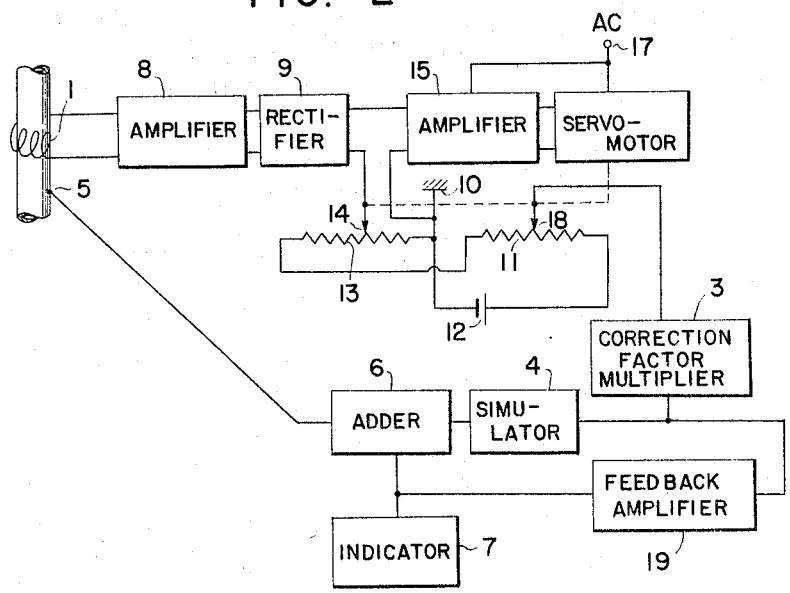
FIG. 2 is a block diagram showing a preferred embodiment of the invention.

FIG. 2 shows a connection diagram of one embodiment of this invention. As already mentioned, since it is usual to lay a number of single core power cables in a common duct, it is advantageous to use an air core toroidal type current transformer as the detector 1 for the conductor current in order to decrease the effect of electromagnetic induction from adjacent cables. The output voltage from the current detector 1 is amplified to a required magnitude by a high input impedance amplifier 8 and is then applied to a rectifier 9. One of the output terminals of the rectifier 9 is grounded at 10 through the sliding arm 14 of a linear type variable resistor 13, whose one terminal is directly grounded a second variable resistor 11 of the squaring type, and a source of direct current 12. The other output terminal of the rectifier 9 is grounded at 10 through the input of a chopper type direct-current amplifier 15 whose output, which is proportional to the conductor current, is supplied to a servomotor 16 of the operating signal. The chopper type direct-current amplifier 15 and the servomotor 16 are driven by an alternating current supplied from an A.C. input terminal 17. As schematically shown by a dotted line, the sliding arms 14 and 18 of the variable resistor 13 and 11, respectively, are driven by the servomotor 16, so that a signal which is proportional to the square of the conductor current is obtained from the slidable arm 18 of the variable resistor 11, and this squared signal is then multiplied by the correction factor K in the correction factor multiplying circuit 3 which comprises a variable resistance, for instance. The output from the multiplying circuit is then compensated for the time delay by the action of the thermal delay simulating circuit 4 to produce a signal representing the temperature difference between the sheath and the conductor.

As shown in FIG. 2 a suitable temperature detector 5 such as a thermo-couple is attached to one point of the cable sheath and a sheath temperature signal obtained therefrom is added to the signal coming from the thermal delay simulating circuit 4 by the addition circuit. The added signals are indicated or recorded by an indicator 7 or an automatic recording meter such as a self-balancing type recording meter. A portion of the output from the addition circuit 6 is fed back to the output terminal of the correction factor multiplying circuit through a feedback amplifier 19 in order to effect temperature compensation of the cable conductor. Although not shown in the drawing, it is preferable to provide the indicator 7 with a suitable alarm device which warns the operator of any dangerous condition such as abnormal temperature rise and the like of the cable.

Figure 3:
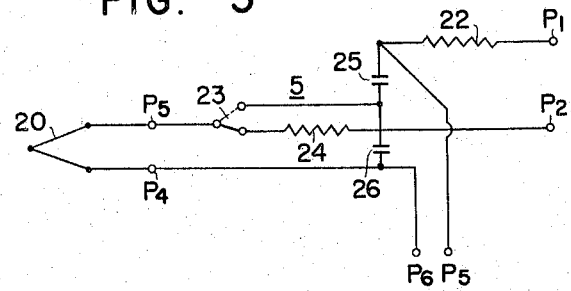
FIG. 3 is a detailed circuit diagram of a portion of the diagram in FIG. 2.

The details of the thermal delay simulating circuit and the addition circuit will now be considered by referring to FIG. 3. One input terminal $P_1$ for the signal representing the temperature difference between the sheath and the conductor is connected to one output terminal $P_5$ via a resistor 22, and the other input terminal $P_2$ for the same signal is connectable to one terminal $P_5$ of a sheath temperature detector 20, for instance, a thermocouple 20, directly or indirectly through a resistor 24 according to the position of a change-over switch 23. The other terminal $P_4$ of the thermocouple 20 is connected to the other output terminal $P_6$. Thus, an output signal corresponding to the sum of the signal representing a portion or the whole of the temperature difference between the sheath and the conductor and the signal representing the sheath temperature is produced across the output terminals $P_5$ and $P_6$. A capacitor 25 connected across said input terminals $P_1$ and $P_2$ for the signal representing the temperature difference between the sheath and the conductor constitutes the thermal delay simulating circuit in cooperation with said resistor 22. Similarly, a resistor 24 and a capacitor 26 constitute the thermal delay simulating circuit for the sheath temperature detecting circuit, the said resistor and capacitor being necessary in the case of measuring temperatures of aerial cables, externally forced-cooled cables, or the like. It will be apparent that any desired time delay compensation can be provided by suitably selecting the values of the resistance 22 and of the capacitor 25 which constitute the thermal delay simulating circuit in accordance with the thermal delay characteristic of the cable.

Although this embodiment utilizes an L type four-terminal network comprising a resistor and a capacitor as the thermal delay simulating circuit, it is possible to simulate more faithfully the thermal delay characteristic of the cable by connecting in cascade across the capacitor 25 one or more stages of L type four-terminal networks, each comprising a resistor and a capacitor.

Figure 4:
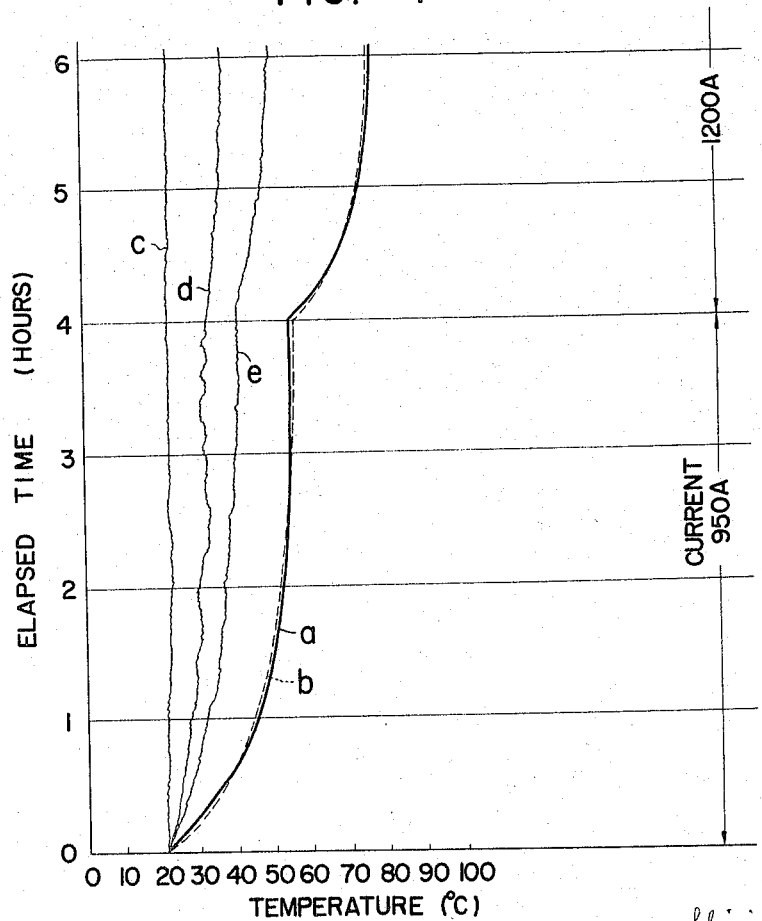
FIG. 4 is a graph illustrating the results of measurement made according to the system of this invention, etc.

FIG. 4 shows a set of curves drawn by an automatic recording instrument which show the relationship between the temperature variation and the time duration of current conduction through a 140 kv., 1 x 600 mm.$^2$ oil-filled cable laid in air, with the conductor current taken as a parameter. In FIG. 4 a curve (a) shows the result of measurement of the conductor temperature according to the system of this invention and a curve (b), which is shown for the purpose of comparison, represents the result of direct measurement of the conductor temperature when a thermocouple is used. Curves (c), (d) and (e) show, respectively, the temperature of the atmosphere, the surface temperature of the cable armour, and that of the lead sheath.

By comparing the curves (a) and (b), it will be clearly noted that the result of measurement according to the supervisory system embodying this invention very faithfully represents the conductor temperature of the cable.

As can be noted from the above description, this invention provides a novel system which makes possible constant supervision of the temperature of a cable conductor which has heretobefore been deemed impossible. Furthermore, the result of measurement is very accurate and yet can be provided by a relatively simple device. Thus, the system of this invention not only contributes to better maintenance and control of single core cables but also improves the utilization factor thereof. In the case wherein the voltage of the power cable is relatively high, compensation of the heat energy produced by dielectric loss of the cable insulator is preferable. Since the amount of the said heat energy corresponds to a constant determined by the kind of the cable, the said compensation can be attained by impressing a voltage corresponding to the said constant on the operational circuit such as, for instance, an adding circuit.

In the above description, a system in which a portion of the output of an adder is fed back to the output terminals of the correction coefficient multiplying circuit through a feedback amplifier has been illustrated as the system of compensating the resistance variation caused by variation of the conductor temperature. However, this system is accompanied by an error occurring therein. Accordingly, in order to carry out the temperature compensation in a more accurate manner, it is preferable to vary the gain of the correction coefficient multiplying circuit in response to the conductor temperature by feeding back a portion of the output of the adder. This variation may be attained by a system wherein a potentiometer is used as the correction coefficient multiplying circuit, and the slider of the said potentiometer is driven in response to the output voltage of the adder.

While in the described embodiment a squaring type variable resistor was illustrated as the squaring circuit, it should be understood that this invention is by no means limited to this particular circuit but can be equally practiced by utilizing a diode having a squaring characteristic or two linear variable resistors so combined as to exhibit a squaring characteristic and that any one of various conventional circuits or apparatus can be used instead of the illustrated correction factor multiplying circuit, thermal delay simulating circuit, and addition circuit, etc. Furthermore, the position of connection of the feedback circuit and the position of insertion of the thermal delay circuit can be suitably altered to suit any particular design.

When applying this invention to the supervision of a number of cables laid in a common duct, it is advantageous to switch the respective inputs by means of a changeover switch.

It is also to be understood that the field of application of this invention is not limited to single-core electric cables alone, but this invention is equally applicable to multicore cables such as three-cored cables and the like if it is capable of measuring the current in each conductor, and where correction depending upon the thermal flow within the cable can be made.

While the invention has been explained by describing a particular embodiment thereof, it will be apparent that improvements and modifications may be made therein without departing from the scope of the invention as defined in the appended claims.

What is claimed is:

1. A supervisory system for the temperature of an electric power cable comprising in combination: first means to produce a signal representing the temperature difference between the conductor and the sheath of said cable, said first means including a detector for the current flowing through said conductor, a squaring circuit, a correction factor multiplying circuit, and a thermal delay simulating circuit; adding means to add said signal to a signal obtained from a sheath temperature detector; and means to represent the sum of said signals.

2. The supervisory system according to claim 1 having means for feeding back a portion of the output from the adding means to the first means to compensate for the resistance change caused by the temperature change of the cable conductor.

3. A supervisory system according to claim 1 said correction factor multiplying circuit including an output terminal; means for feeding back a portion of the output of the adding means to said output terminal so that the gain of the correction factor multiplying circuit is varied in response to variation of the conductor temperature, whereby the resistance variation caused by the temperature variation of the cable conductor is compensated for.

4. The supervisory system according to claim 1 having a toroidal coil which is utilized as the conductor current detector.

5. The supervisory system according to claim 1 having a four-terminal network including a resistor and a capacitor utilized as the thermal delay simulating circuit.

6. The supervisory system according to claim 1 including a thermocouple utilized as the detector for the temperature of the cable sheath.

References Cited by the Examiner

UNITED STATES PATENTS 2,403,372  6/1946  Jackson _____ 73—350

FOREIGN PATENTS 320,193  10/1929  Great Britain.
630,230  10/1949  Great Britain.

LOUIS R. PRINCE, *Primary Examiner.*

S. C. SWISHER, *Assistant Examiner.*